(12) United States Patent
Genoud et al.

(10) Patent No.: US 7,513,139 B2
(45) Date of Patent: Apr. 7, 2009

(54) ELECTRONIC BALANCE HAVING A CALIBRATION WEIGHT ARRANGEMENT

(75) Inventors: Dominique Genoud, Uster (CH); Christoph Latzer, Pfäffikon (CH)

(73) Assignee: Mettler-Toledo AG, Greifensee (CH)

( * ) Notice: Subject to any disclaimer, the term of this patent is extended or adjusted under 35 U.S.C. 154(b) by 178 days.

(21) Appl. No.: 11/164,799

(22) Filed: Dec. 6, 2005

(65) Prior Publication Data

US 2006/0196703 A1 Sep. 7, 2006

(30) Foreign Application Priority Data

Dec. 23, 2004 (EP) .................................. 04106971

(51) Int. Cl.
*G01G 23/01* (2006.01)
(52) U.S. Cl. .......................................... 73/1.13; 177/50
(58) Field of Classification Search .................. 73/1.13; 177/229, 50
See application file for complete search history.

(56) References Cited

U.S. PATENT DOCUMENTS

| | | | | |
|---|---|---|---|---|
| 3,738,439 A * | 6/1973 | Hebert | ...... | 73/1.13 |
| 3,924,443 A * | 12/1975 | Hebert | ...... | 73/1.13 |
| 4,425,975 A * | 1/1984 | Luchinger | ...... | 177/50 |
| 4,766,965 A * | 8/1988 | Luchinger | ...... | 73/1.13 |
| 5,148,881 A | 9/1992 | Leisinger | ...... | 177/50 |
| 5,641,948 A * | 6/1997 | Burkhard | ...... | 177/229 |
| 5,866,854 A * | 2/1999 | Emery et al. | ...... | 177/50 |
| 6,194,672 B1 | 2/2001 | Burkhard | ...... | 177/210 EM |
| 6,414,252 B1 * | 7/2002 | Emery et al. | ...... | 177/229 |
| 7,176,389 B2 * | 2/2007 | Iiduka | ...... | 73/1.13 |
| 2006/0196700 A1 * | 9/2006 | Genoud et al. | ...... | 177/50 |
| 2007/0034422 A1 * | 2/2007 | Genoud et al. | ...... | 177/211 |

FOREIGN PATENT DOCUMENTS

DE  201 19 525 U1  5/2003

\* cited by examiner

*Primary Examiner*—Hezron Williams
*Assistant Examiner*—Nashmiya S Fayyaz
(74) *Attorney, Agent, or Firm*—Standley Law Group LLP (57) ABSTRACT

The calibration weight arrangement for an electronic balance with a force-transmitting device (1), includes a calibration weight (14) capable of coupling to the force-transmitting device (1). The calibration weight (14) is moved vertically by a transfer mechanism and a drive source to establish and to release the force-transmitting contact between the calibration weight (14) and the force-transmitting device (1). The transfer mechanism has at least one resetting element (22, 37, 38, 40, 43) and a lifting system configured as a knee joint linkage (17, 117, 217). The resetting element (22, 37, 38, 40, 43) and the lifting system work together to arrest and cushion the calibration weight (14) if the balance is shocked, dropped or hit.

20 Claims, 5 Drawing Sheets

Fig. 9b

ELECTRONIC BALANCE HAVING A CALIBRATION WEIGHT ARRANGEMENT

TECHNICAL FIELD

The invention relates to a calibration weight arrangement for an electronic balance that comprises a force-transmitting device. The invention relates in particular to a lifting system for a calibration weight arrangement.

BACKGROUND OF THE ART

Electronic balances in many cases are calibrated by means of an internal calibration weight. To perform a calibration, a calibration weight of a specifically defined mass is brought into force-transmitting contact with the force-transmitting device that is arranged in a force-measuring cell of a balance, whereupon a reference value is determined. Based on this reference value, further weighing parameters of the balance can be adjusted. After the calibration has been performed, the contact between the calibration weight and the force-transmitting device is released again, and the calibration weight is secured in a rest position. In the foregoing process, the calibration weight is moved from a rest position into a calibration position and back to the rest position by a transfer mechanism. In the calibration position, the calibration weight is in force-transmitting contact with the force-transmitting device; in the rest position there is no force-transmitting contact. In many balances, the calibration weight arrangement and the force-transmitting device are arranged behind one another, as disclosed in commonly-owned U.S. Pat. No. 6,194,672 to Burkhard.

There are a diversity of transfer mechanisms for moving a calibration weight which, when in its rest position, in most cases rests on a holder that is connected to a lifting system.

A calibration weight arrangement is disclosed in commonly-owned U.S. Pat. No. 5,148,881 to Leisinger with a calibration weight that is moved vertically by wedges arranged in pairs which slide horizontally against each other, whereby the calibration weight is brought into force-transmitting contact with the force-transmitting device of the balance. This transfer mechanism is driven by a motor through a spindle that is connected to the wedges.

A likewise vertical lifting and lowering of a calibration weight is achieved by a device that is described in Burkhard '672. The weight rests on a holder which is moved by an electrically driven transfer mechanism.

It is important for the calibration weight to be securely immobilized, primarily in the rest position, even in the presence of shocks, hard knocks, or if the balance is dropped, so that the calibration weight is not abruptly brought into contact with the force-transmitting device and thereby causes damage to the lever mechanism. The transfer mechanisms of the known state of the art secure the calibration weight by simply pressing it as firmly as possible against a fixed stop, an arrangement which protects the calibration weight only against falling out of its holder as a result of a shock or a fall to the floor which could occur for example while the balance is being transported. If an abrupt force acts on the calibration weight, it will be directly passed on to the transfer mechanism, whereby the latter could even be destroyed.

Consequently, the object to be accomplished is to create a calibration weight arrangement with a transfer mechanism that not only keeps the calibration weight immobilized in case the balance is hit, shocked or dropped, but also provides protection by absorbing and redirecting a suddenly attacking force.

SUMMARY OF THE INVENTION

The foregoing object is accomplished in a calibration weight arrangement for an electronic balance that has a force-transmitting device, wherein the calibration weight arrangement comprises at least one calibration weight with the capability of being coupled to the force-transmitting device, a transfer mechanism, and a drive source to effect a vertical displacement of the calibration weight. The transfer mechanism comprises at least one resetting element and a lifting system with at least one knee joint linkage.

The resetting element and the lifting system are matched to each other in such a way that the knee joint buckles already under the effect of a small pulling force on the lifting system, whereby the calibration weight is brought into force-transmitting contact with the force-transmitting device. The force action of the resetting element, in turn, is designed to not only stretch the knee joint linkage back to a straight position when the pulling force is removed, but to move the knee joint beyond the stretched position. Thus, the knee joint is slightly overstretched, so to speak. The term "overstretched" in the present context and hereinafter refers exclusively to a bending of the knee joint into the opposite direction from the calibration position of the knee joint. In the rest position, the overstretched knee joint is pushed against a fixed stop. Such an arrangement with a stop has the advantage that on the one hand a knee joint in a slightly bent condition is more stable than in the completely stretched condition, and on the other hand when a force acts on the balance and thus also on the calibration weight arrangement as a result of a sudden shock, the force can be taken up and passed on through the knee joint and the stop without allowing the calibration weight to have an effect on the force-transmitting device of the balance.

Different kinds of resetting elements can be used, depending on the design of the transfer mechanism and in particular of the lifting system. Among others, this includes different kinds of springs or other components that have a comparable effect. In the rest position of the calibration weight arrangement, the resetting elements preferably have a slight pretension. Different kinds of springs can be used, as for example leg springs, compressive coil springs, tensile springs, or leaf springs. It is a particular advantage of using leg springs that the restoring force of the spring acts directly on the knee joint and that the spring itself, due to the way in which it is fastened in place, cannot vibrate nor change its position in other ways.

The lifting system preferably consists of two knee joints that are connected to each other. The knee joints, in turn, can include a plurality of formed parts that are connected to each other directly or through appropriate connecting means, or could also be configured monolithically in one piece. With an appropriate design, the lifting system can also have only a single knee joint.

The resetting force of the resetting element is matched to the transfer mechanism in which the resetting element is installed in order to ensure that the calibration process works optimally as it brings the calibration weight into contact with the force-transmitting device and then releases the contact again.

A variety of different drive mechanisms recommend themselves for driving a calibration weight arrangement with a lifting system in the form of a knee joint linkage, in particular linear-motion mechanisms such as spindle drives, belt drives, magnetic drives, or also linear motors. Drive devices made at least in part of a shape memory alloy are particularly distinguished by their small size and compactness.

The drive mechanism can actuate the transfer mechanism for example by redirecting the force by means of at least one roller or lever.

BRIEF DESCRIPTION OF THE DRAWINGS

Different embodiments of the calibration weight arrangement are shown hereinafter in the drawing figures, wherein.

DETAILED DESCRIPTION OF A PREFERRED EMBODIMENT

Figure 1:
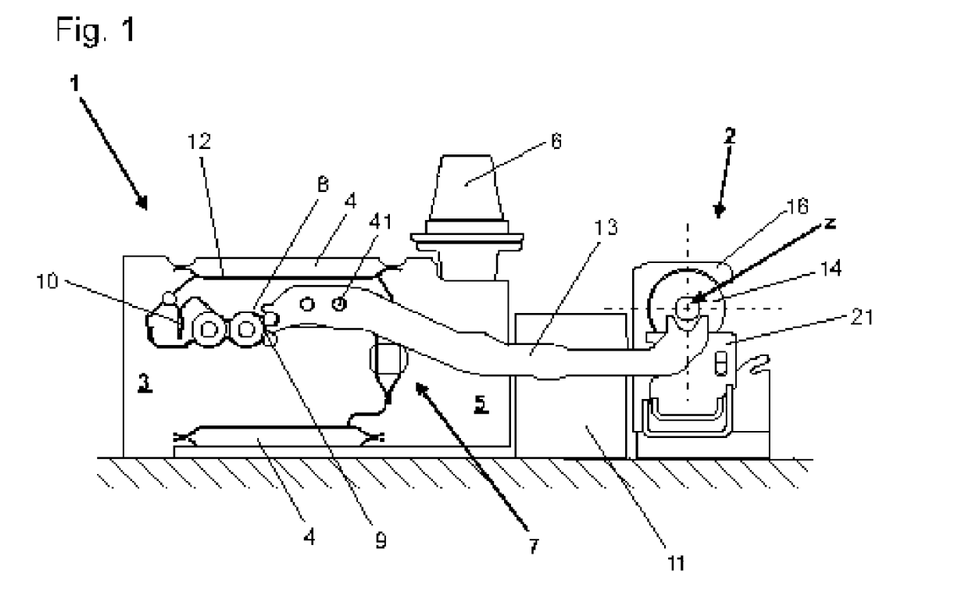
FIG. 1 is a schematic, simplified side view of a force-transmitting device of an electronic balance with extended calibration weight receivers and a calibration weight arrangement located beside the force-transmitting device, wherein a calibration weight with a calibration axis is shown in its rest position.
Figure 2:
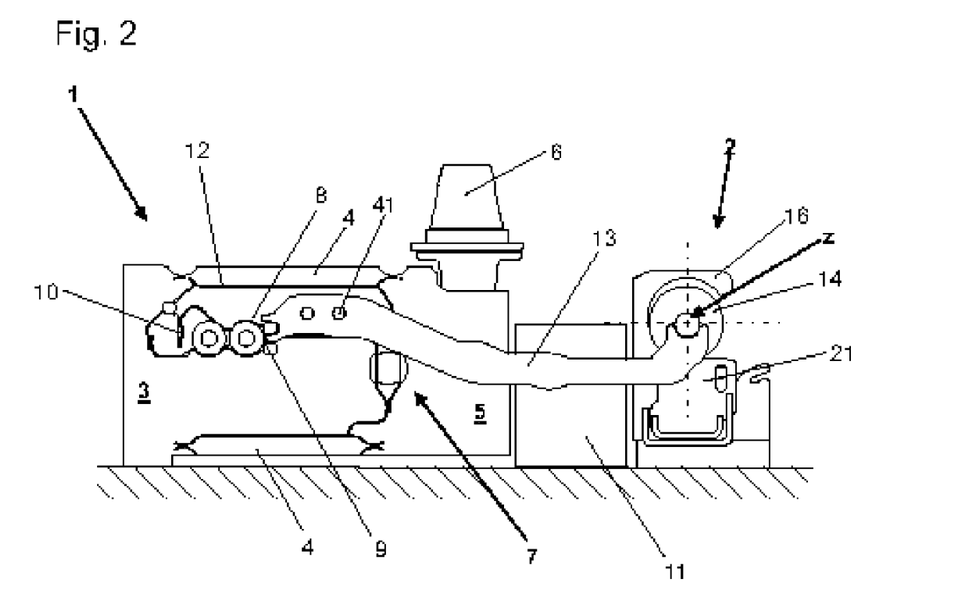
FIG. 2 is a schematic, simplified side view of the force-transmitting device and the calibration weight arrangement of FIG. 1 during the calibration.

FIGS. 1 and 2 serve to visualize in a side view how a force-transmitting device 1 and a calibration weight arrangement 2 are arranged in a known manner in a force-measuring cell of an electronic balance. FIG. 1 illustrates a calibration weight arrangement 1 according to the invention in its rest position, and FIG. 2 shows a calibration weight arrangement 1 according to the invention in its calibration position. The force-transmitting device 1 comprises a parallel-guiding mechanism with a stationary parallelogram leg 3 and a movable parallelogram leg 5, wherein the latter is constrained to the former by two parallelogram guides 4. A weighing pan (not shown in the drawing) connects through a cone 6 to the movable parallelogram leg 5 which in response to a load on the weighing pan is movable relative to the stationary parallelogram leg 3, following the direction of gravity. The force-transmitting device 1 comprises a first coupling element 7 which, when a force is introduced into the movable parallelogram leg 5, transmits the force to a lever mechanism. In the force-transmitting device 1 as illustrated, the lever mechanism has a first force-reduction lever 8 which is connected through a second coupling element 10 to a second lever 9. The first and second coupling elements 7, 10 act, respectively, on the first and second levers 8, 9 through flexure joints in the form of thin material connections. A displacement of the movable parallelogram leg 5 in the direction of gravity causes a force to be transmitted to the lever mechanism. The latter reduces the force and transmits it further to a force compensation system 11 which is often based on an electromagnetic principle and is not shown in detail in the drawing.

The parallel-guiding mechanism 3, 4, 5, the first and second coupling elements 7, 10, and the first and second levers 8, 9 are formed in the substantially brick-shaped material block in such a manner that the different material portions of the block are separated from each other by material-free spaces in the form of narrow linear cuts 12 that cut through the material block perpendicular to its largest surface. The narrow linear cuts 12 are produced preferably by spark erosion.

The lever 8 has holes where two calibration weight receivers 13 (only one of which is within view) are attached by means of suitable fasteners 41, so that the calibration weight receivers 13 act as an extension of the shorter lever arm on the force-input side of the first lever 8.

As can be seen in FIG. 1, during a weighing process the calibration weight 14 which has a calibration weight axis (z) rests on a calibration weight holder 21 and is pushed against the lateral parts of the calibration weight arrangement 2 which are configured as parking brackets 16. For the sake of clarity, the front-facing lateral part of the calibration weight arrangement 2 has been removed from this drawing so that the calibration weight holder 21 and in particular the area of contact between the calibration weight 14 and the calibration weight receivers 13 are within view. The same applies to FIG. 2. In FIG. 1, the calibration weight 14 is completely uncoupled from the lever mechanism of the force-transmitting device 1.

To perform a calibration, the calibration weight 14 is lowered by means of a transfer mechanism (hidden from view here by the calibration weight holder 21) onto the two calibration weight receivers 13, whereby the calibration weight is put into force-transmitting contact with the lever mechanism, as shown in FIG. 2. The calibration weight 14 rests completely on the calibration weight receivers 13. In this illustration, the transfer mechanism is hidden from view by the calibration weight holder 21. The transfer mechanism comprises a lifting system and a drive source. The drive source is generally arranged next to the calibration weight arrangement, i.e., in relation to this illustration either in front of the drawing plane or behind it.

Figure 3:
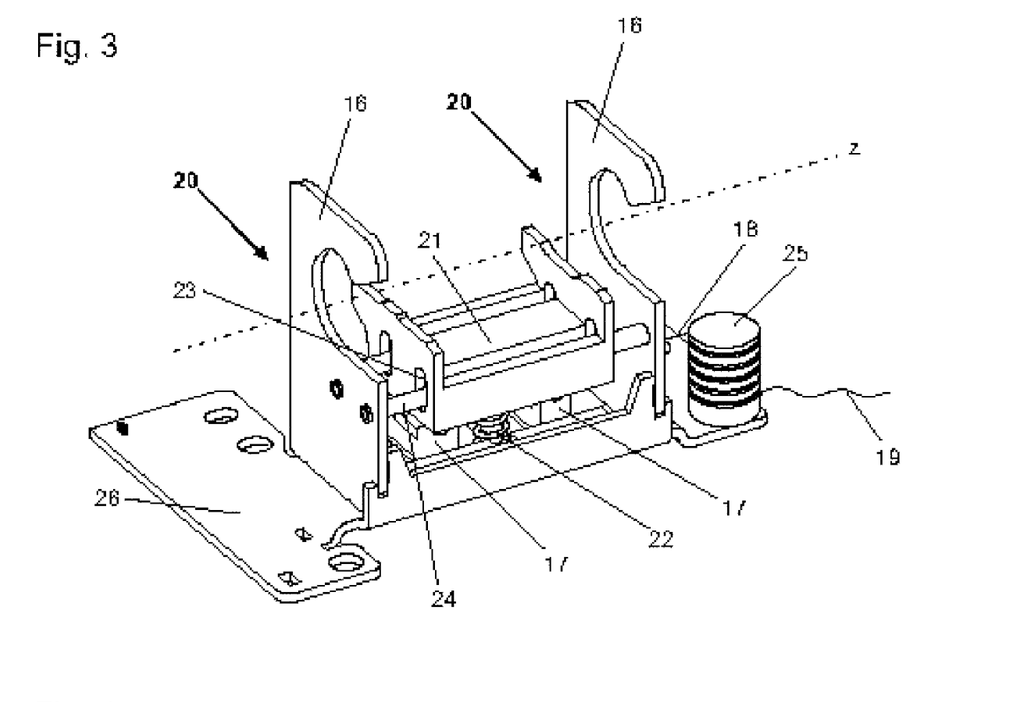
FIG. 3 is a perspective view of a calibration weight arrangement with two knee joint linkages whose pivotal axes are orthogonal to the calibration weight axis, and with an actuator in the form of a wire of a shape memory alloy.

FIG. 3 gives a detailed representation of a calibration weight arrangement. The perspective view shows a calibration weight arrangement without a calibration weight. The illustrated embodiment has a lifting system with two knee joint linkages 17 powered in part by an actuator 18 configured as a wire of a shape memory alloy (SMA), with a means for heating the wire. The orientation of the calibration weight is indicated by the calibration weight axis (z).

Shape memory alloys are distinguished in that they change their physical properties due to a solid state phase transition that occurs when they are heated above a phase transition temperature. Shape memory alloys are more formable at temperatures below their phase transition temperature than they are at temperatures above the phase transition temperature. If the shape memory alloy has the form of a wire, a temperature rise beyond the phase transition temperature causes the wire to contract in length so that it can exert a force which, for example, acts as a pulling force on the knee joints 17 shown here and thereby changes their positions. The temperature rise can occur simply by supplying a current to the wire 18, as indicated here by the electrical connection 19 at one end of the wire. The wire is connected to ground at the opposite end which is hidden from view here. A shape memory alloy contracts in length by a certain percentage. For example, a nickel-titanium alloy with a phase transition temperature of about 90° C. and a nickel content of about 50% gets shortened by about 4%. However, the wire 18 is flexible and is given several changes in direction, for example as shown here by training the wire around a roller 25 of an electrically and thermally nonconductive, gliding technical polymer such as Teflon. The wire can also be redirected by a plurality of direction-changing means such as levers and/or rollers.

The lateral parts 20 of the calibration weight arrangement comprise circular-shaped cutouts, referred to herein as parking brackets 16, against which the calibration weight (not shown here) is pushed in its rest position while it is seated on the calibration weight holder 21. Located below the calibration weight holder 21 is the transfer mechanism consisting of a lifting system of two identically constructed knee joint linkages 17 and a compressive coil spring 22 as a resetting element (also see FIG. 4). The knee joints 17 are connected to each other and cooperate in such a way that both together can easily be moved by a drive source, in this case a linear drive comprising an SMA wire 18. The contracting SMA wire 18 exerts on the two knee joints 17 a pulling force that is directed to the right in the illustrated situation, which has the effect that the knee joints 17 fold and thereby cause a vertical downward displacement of the calibration weight holder 21. This tightens the resetting element 22. The wire 18 runs through an opening (hidden from view here) in the lateral part 20 of the calibration weight arrangement.

In this embodiment, the vertical movement of the calibration weight holder 21 is guided by two guide rods 24 which are fastened to the two lateral parts 20, with each of the guide rods reaching through an elongated hole 23 of the calibration weight holder 21 and thereby preventing the latter from tipping. At the same time, the vertical displacement travel of the calibration weight holder 21 is delimited by the height of the elongated hole 23.

Figure 4:
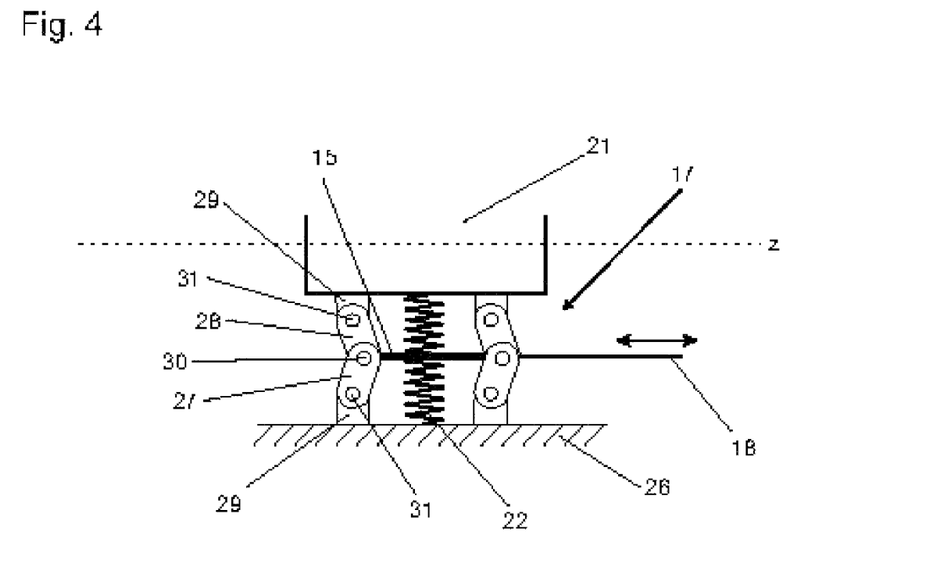
FIG. 4 is a simplified, schematic frontal view of a lifting system in the form of a knee joint linkage, wherein the pivotal axes of the joints are orthogonal to the calibration weight axis.

FIG. 4 gives a schematic representation of the transfer mechanism of FIG. 3 in an intermediate position between the calibration position and the rest position. Below the calibration weight holder 21, which is only fragmentarily indicated, there is an arrangement of two knee joint linkages 17 with a compressive coil spring 22 serving as resetting element. The pivotal axes of the knee joint linkage 17 are arranged at a right angle to the calibration weight axis (z) (see also FIGS. 1, 2), and the knee joints 17 are connected to each other by a rigid connecting element 15. Each of the knee joint linkages consists substantially of two formed parts 27, 28 which are fastened by connecting parts 29 to the base plate 26 or to the calibration weight holder 21. The formed parts 27, 28 are connected to each other through a connecting means 30, to the base plate 22 through the connecting parts 29, and to the calibration weight holder 21 through the connecting means 31. Depending on the design of the formed parts 27, 28, the connecting means 30, 31 can for example consist of rods with securing elements or they can be rivets. The formed parts 27, 28 can be either made of one piece extending below the entire calibration weight holder 21, or they can be formed of plate material and be connected by rods or similar elements (also see FIG. 5).

The linear drive comprising an SMA wire 18 is fastened to one of the knee joint linkages 17 that are connected to each other. When the drive exerts a pulling force on the knee joints 17, they will buckle and thereby cause a vertical downward displacement of the calibration weight holder 21. At the same time, the compressive coil spring 22 is compressed or put into a stressed condition by the weight of the calibration weight holder 21 and initially also by the weight of the calibration weight resting on it (not shown in this drawing). In the course of the downward travel of the calibration weight holder 21, the calibration weight is lowered onto the calibration weight receivers (see FIG. 1), at which point it is no longer in contact with the calibration weight holder 21.

When the drive ceases to exert its pulling force, the resetting element 22 can decompress again and thereby causes the knee joints 17 to straighten and the calibration weight holder 21 to return to its rest position. In its upward movement, the calibration weight holder 21 picks up the calibration weight from below and thereby releases it from its force-transmitting connection with the force-transmitting device of the balance. If the drive comprises an SMA wire 18, the resetting element 22 also has the effect that the wire is stretched back to its original length as it cools down, which requires the application of a force.

Figure 5:
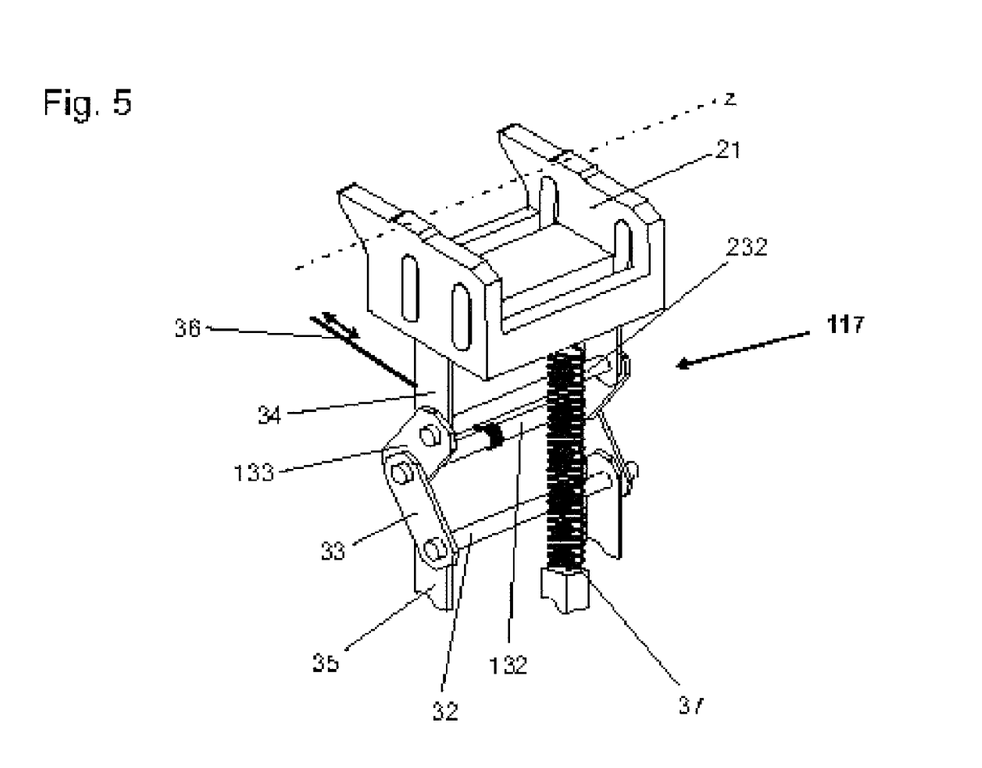
FIG. 5 is a perspective view of a transfer mechanism in its calibration position with a compressive coil spring as resetting element and a lifting system in the form of a knee joint linkage, wherein the pivotal axes of the joints are arranged parallel to the calibration weight axis and a displacement is effected by a pull exerted directly on the knee joint.

A further embodiment of the transfer mechanism is shown in FIG. 5. The lifting system has two knee joints 117 that are assembled of formed parts 33, 133 of flat plate material which are connected by appropriate connecting means 132 such as rods. The pivotal axes of the knee joints 117 are arranged parallel to the calibration weight axis (z) in this embodiment (also see FIGS. 1, 2). The formed parts 33, 133 are connected to the connector parts 34, 35 through further, analogous connecting means 32, 232. The connector part 34, in turn is connected to the calibration weight holder 21. The connector part 35 serves among other things to fasten the lifting system to the calibration weight arrangement, for example to a base plate or the lateral parts (see FIG. 2). It is also possible to use one of the connecting rods 32, 232 for the attachment to the calibration weight arrangement, for example to the lateral parts of the calibration weight arrangement.

The function of the knee joint linkages 117 is analogous to what has been described hereinabove. However, the drive 36, which is only symbolically indicated here, exerts its pulling force directly to the central connecting means 132 and thereby causes the knee joints 117 to fold as can be seen in the drawing. As a resetting element 37, there is a compressive coil spring fastened between a base plate and the calibration weight holder 21. In the calibration position shown here, the spring 37 is compressed, while the drive 36 exerts a pulling force on the knee joints 117. When the pulling force of the drive 36 subsides, the spring 37 can almost completely decompress again and thereby cause the knee joints 117 to straighten up so that the calibration weight holder 21 moves back to its rest position. The buckling of the knee joints 117 shown in this embodiment is triggered already by a short pull of only a few millimeters.

Figure 6:
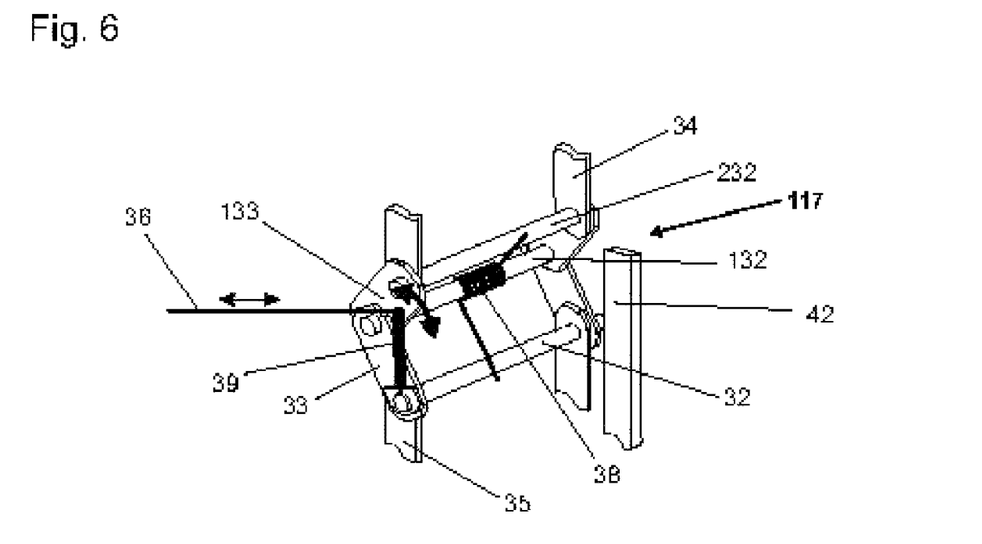
FIG. 6 is a perspective view of a transfer mechanism in its calibration position with a leg spring as resetting element and a lifting system in the form of a knee joint linkage, wherein the pivotal axes of the joints are arranged parallel to the calibration weight axis and a displacement is effected by means of a lever.

Compressive coil springs are only one of the possible designs for the resetting element. FIG. 6 shows a transfer mechanism with the same lifting system and in the same orientation as in FIG. 5 except for the resetting element which has the form of a leg spring 38, and a lever 39 which provides the point of application for the pulling force of the drive 36.

The function of the lifting system, i.e., the knee joint linkage, is analogous to the lifting system of FIG. 5. The calibration weight holder has been omitted in FIG. 6 for the sake of clarity. In addition, the embodiment of FIG. 6 comprises a displacement stop 42, shown here as an example in the form of a post. The displacement stop is arranged so that at least one knee joint 117 in its rest position bears against the stop whereby the transfer mechanism is secured in its rest position.

It is very advantageous to design the resetting element 38 as a leg spring. The leg spring 38 is wound around the central connecting rod 132, and its two legs are bearing against the lower and upper connecting rods 32, 132, respectively, so that the leg spring 38 is tightened further as the knee joints 117 are folding, and when the force ceases to pull on the knee joints, the spring legs will straighten the knee joints again and, if the leg spring 38 is sufficiently pre-tensioned, will move the knee joints beyond the stretched position and press them against the stop 42. It is of advantage that the leg spring 38 exerts a directionally defined force on the knee joints 117 and is constrained by the attachment of the spring 38 to the central connecting rod 132.

The knee joints in this embodiment comprise a lever 39 fixedly attached to one of the lower formed parts 33, and the drive source 36 which is only symbolically indicated here acts on the lever. When the pulling force ceases, the knee joints as well as the lever 39 move to the right in relation to the drawing, as indicated by the double arrow, and the calibration weight holder (not shown here) is moved in the upward direction. The lever 39 can act on the knee joint or be attached to it in different places, for example on one of the lower formed parts 33 or on one of the axles 132, 133.

Figure 7:
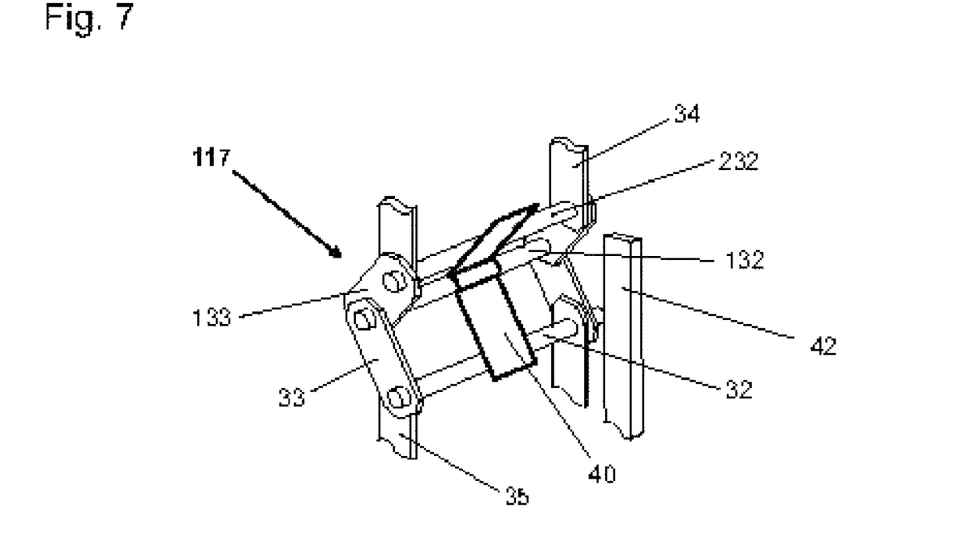
FIG. 7 is a perspective view of a transfer mechanism in its calibration position with a leaf spring as resetting element and a lifting system in the form of a knee joint linkage, wherein the pivotal axes of the joints are arranged parallel to the calibration weight axis.

FIG. 7 illustrates a transfer mechanism with two knee joint linkages 117 and with a leaf spring 40 as a resetting element. The design and function of a transfer mechanism of this kind are analogous to what has been described in the context of FIGS. 5 and 6. The drive which exerts a pulling force can be fastened as shown in FIG. 5 or 6. In the embodiment of FIG. 7, a leaf spring 40 is fastened through a sleeve to the central connecting rod 132, so that during a calibration the leaf spring 40 is pressed together by the upper and lower connecting rods 32. When the force of the drive (see FIGS. 5, 6) ceases to pull on the knee joints 117, the leaf spring 40 pushes against the upper and lower connecting rods 32, 232 and thereby straightens the knee joints 117 again and pushes them into the overstretched condition.

Figure 8:
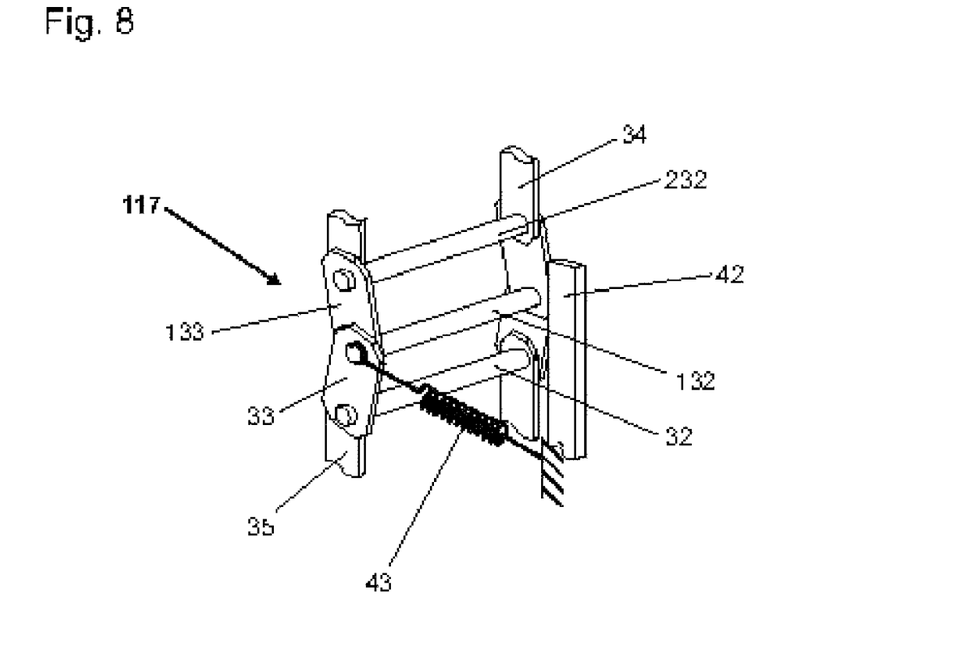
FIG. 8 is a perspective view of a transfer mechanism in its rest position with a tension spring as resetting element and a lifting system in the form of a knee joint linkage, wherein the pivotal axes of the joints are arranged parallel to the calibration weight axis.

A further embodiment of the transfer mechanism, shown here in its rest position, is illustrated in FIG. 8. The design and function of this kind of transfer mechanism are analogous to what was described in the context of FIGS. 5 to 7. The resetting element, again slightly pre-tensioned, is configured here as a tension spring 43, exerting a force on the knee joints 117 and pulling at least one of the knee joints 117 that are in their overstretched position against at least one stop 42, thus arresting the knee joints. In this embodiment, the tension spring 43 is firmly attached between on of the formed parts 33, 133 and a holder that is not shown in detail here, for example a housing wall. If a drive source (see FIG. 5 or 6) exerts a force on the transfer mechanism that acts against the force of the tension spring 43, the latter is pulled out further and the knee joints 117 move first through their stretched condition before they are made to fold (see FIGS. 5 to 7), whereby the calibration weight holder (not shown here) is lowered and the calibration weight is brought into force-transmitting contact with the force-transmitting device.

Figure 9A:
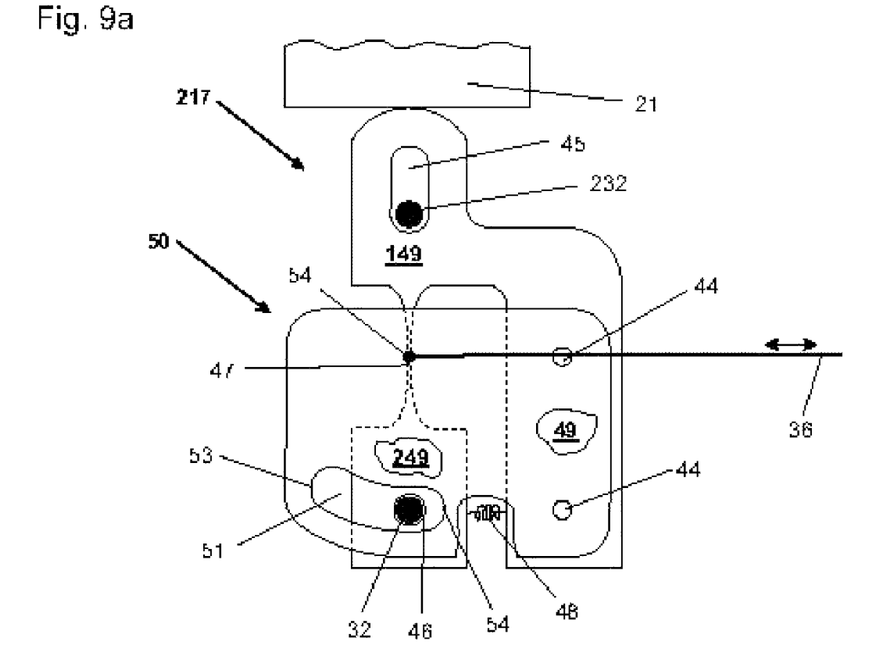
FIG. 9a is a side view of a monolithically formed knee joint linkage in the stretched position, with an integrally incorporated displacement stop.
Figure 9B:
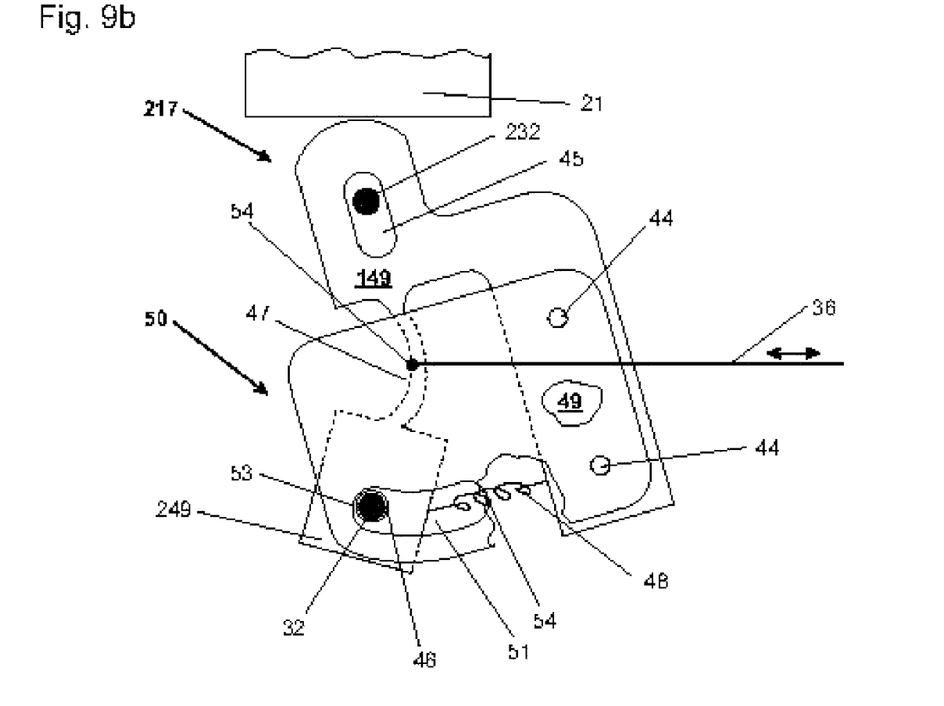
FIG. 9b is a side view of a monolithically formed knee joint linkage in the calibration position, with an integrally incorporated displacement stop.

In addition to the knee joint linkages shown up to this point, it is also possible to combine a monolithically formed knee joint for example with a transfer mechanism similar to the mechanism shown in FIGS. 5 to 8. A knee joint linkage 217 of this type is illustrated in FIGS. 9a and 9b. FIG. 9a shows the monolithically constructed knee joint in a stretched condition, i.e., the knee joint is aligned vertically and is in a state close to its rest position, but is not yet pushed against a stop. FIG. 9b shows the monolithic knee joint in its calibration position. The drawings are oriented so that the calibration weight holder 21 lies outside the upper border of the drawing. The hand-drawn lines indicate that the respective elements lie behind the plane of the drawing and would normally be covered from view.

The knee joint 217 is of one piece, preferably made of a technical polymer material. It consists of three functional areas that are connected to each other. The first area 49 comprises two openings 44 that serve to fasten the displacement-stop element 50 to the knee joint 217. The displacement-stop element 50 and the knee joint 217 are fixedly connected to each other and can also be realized as one single component. The second area 149 is fixedly connected to the first area 49 and comprises an elongated hole 45. The third area 249 comprises a further opening 46 and is connected to the second area 149 through a flexure pivot 47 and to the first area 49 through a tension spring 48 as a resetting element.

The monolithically designed knee joint 217 can replace the knee joints 117 in FIGS. 5 to 8. Furthermore, using the monolithically constructed knee joint 217 offers the possibility of a design with only two connecting rods 32, 232. The function of the central connecting rod 132 (see FIGS. 5 to 8) is taken over by the flexure pivot 47.

To build a transfer mechanism, two knee joint linkages 217 are connected through two connecting rods 32, 232. The lower connecting rod is firmly connected to the area 249 by means of the opening 46, and the upper connecting rod is guided by the elongated hole 45 in the area 149. The two connecting rods 32, 232 in this embodiment are attached in a fixed position to the housing. The calibration weight holder 21 is connected to the knee joint 217, with the elongated hole 45 defining the range of vertical displacement of the knee joint 217 and thus the displacement range of the calibration weight holder.

The stop element 50 comprises an elongated hole 51 whose position corresponds to the opening 46 and which guides and delimits the movement of the lower connecting rod 32. The two ends of the elongated hole 51 comprise first and second stops 52 and 53, respectively. The first stop 52 is the limit stop for the connecting rod 32 when the transfer mechanism is in its rest position when the knee joint is moved beyond its straight position, i.e., when it is overstretched. The stop 53 is the limit stop for the connecting rod 32 in the calibration position of the transfer mechanism, i.e., when the calibration weight is in force-transmitting contact with the force-transmitting device and the knee joint 217 is in a folded condition.

When a calibration is performed (see FIG. 9b), the drive 36 (only symbolically indicated here) which is connected to the stop element 50 through a fastening part 54, for example a hole or a hook, exerts a pulling force on the stop element 50, with the pull directed to the right-hand side in the drawing. As a result, the stop element 50 and the area 49 of the knee joint 217 are pulled to the right. Since the area 249 of the knee joint 217 is solidly connected to the lower connecting rod 32, the drive 36 causes the resetting element 48 to be tensioned and the flexure pivot 47 to be bent. Consequently, the area 249 swivels with a slight rotation about the connecting rod 32. Furthermore, the second area 149 of the knee joint 217, to which the calibration weight holder is connected, is pulled downward and simultaneously rotated to the left. The knee joint 217 buckles and the calibration weight holder 21 is displaced downward, whereby the calibration weight is brought into force-transmitting contact with the force-transmitting device.

The FIGS. 5 to 8 represent knee joints that are assembled from formed parts in the shape of flat plates which are connected by rods. It is also conceivable for a knee joint of this kind to consist of monolithically designed formed parts 33, 133 taking up the entire width of the calibration weight holder. It is likewise possible to replace the two formed parts 33, 133 by one of the monolithically formed components 217 with an integral stop element 50 as presented in FIG. 9.

In addition to the drive described above which includes a shape memory alloy, one could at least in principle use any commercially available drive source, and with preference any linear drive source, if it meets the requirements for driving a calibration weight arrangement of an electronic balance. The known state of the art of linear drives includes, among others, spindle drives, belt drives, magnetic drives, or linear motors.

In the embodiments of the foregoing description, the resetting elements were primarily springs such as compressive coil springs, leg springs and leaf springs. In addition to these explicitly named types of springs, one could of course also use other kinds of springs or components that work in a comparable way. Depending on the amount of restoring force that needs to be generated, one can use either a single resetting element or a plurality of resetting elements.

The force-transmitting device mentioned here represents only one of the known kinds of force-transmitting devices. The calibration weight arrangement according to the invention can also be used in combination with other force-transmitting devices.

In the FIGS. 5 and 6, two different points of force application of the drive are shown as examples, but one could also realize arrangements with other points of force application.

The stop 42 shown in FIGS. 5 to 8 has the form of a post only to serve as an example. Any other concept that has the same effect or function could likewise be used.

What is claimed is:

1. A calibration weight arrangement for an electronic balance having a force-transmitting device, the calibration weight arrangement comprising:
   a calibration weight;
   a knee joint linkage, positioned below the calibration weight, with a central pivot point for selectively decoupling the calibration weight from the force-transmitting device in an straightened position and coupling the calibration weight thereto in a buckled position;
   a resetting element arranged to urge the knee joint linkage into the decoupled, straightened position; and
   a drive source, selectively acting on the central pivot point to urge the knee joint linkage to the buckled position.

2. The calibration weight arrangement of claim 1, wherein the resetting element has a resetting force of a sufficient magnitude to counteract the weight force of the calibration weight and a calibration weight holder associated therewith and to move the knee joint linkage from a calibration position back to a rest position.

3. The calibration weight arrangement of claim 2, wherein the calibration weight arrangement further comprises: a displacement stop for the knee joint linkage in the rest position thereof.

4. The calibration weight arrangement of claim 3, wherein the resetting element is selected from the group consisting of: a leg spring, a leaf spring, and a tension spring.

5. The calibration weight arrangement of claim 2, wherein the resetting element is a compressive coil spring.

6. An electronic balance, comprising:
   a force-transmitting device;
   a calibration weight;
   a knee joint linkage, positioned below the calibration weight, with a central pivot point for selectively decoupling the calibration weight from the force-transmitting device in an straightened position and coupling the calibration weight thereto in a buckled position;
   a resetting element arranged to urge the knee joint in linkage into the decoupled, straightened position; and
   a drive source, selectively acting on the central pivot point to urge the knee joint linkage to the buckled position.

7. The calibration weight arrangement of claim 5, wherein the knee joint linkage is formed monolithically of one piece.

8. The calibration weight arrangement of claim 7, wherein the drive source comprises a linear drive.

9. The calibration weight arrangement of claim 7, wherein the drive source further comprises an actuator of a shape memory alloy working together with a heating device.

10. The calibration weight arrangement of claim 9, wherein the actuator is configured as a wire.

11. The calibration weight arrangement of claim 10, further comprising at least one roller or at least one lever, through which the drive source acts on the knee joint linkage to effect the vertical displacement.

12. The calibration weight arrangement of claim 1, wherein the calibration weight arrangement further comprises: a displacement stop for the knee joint linkage in a rest position thereof.

13. The calibration weight arrangement of claim 1, wherein the resetting element is selected from the group consisting of: a leg spring, a leaf spring, and a tension spring.

14. The calibration weight arrangement of claim 1, wherein the resetting element is a compressive coil spring.

15. A calibration weight arrangement for an electronic balance having a force-transmitting device, the calibration weight arrangement comprising:
   a calibration weight;
   a transfer mechanism for coupling and decoupling the calibration weight to and from the force-transmitting device, the transfer mechanism comprising a resetting element and a lifting system with a knee joint linkage in which a first and a second member are pivotably joined together at an end of each member; and
   a drive source for effecting a vertical displacement of the calibration weight;
   wherein the resetting element is selected from the group consisting of: a leg spring, a leaf spring, a tension spring and a coil spring.

16. The calibration weight arrangement of claim 4, wherein the knee joint linkage comprises at least two formed parts that are connected to each other either directly or through suitable connecting means.

17. The calibration weight arrangement of claim 1, wherein the knee joint linkage is formed monolithically of one piece.

18. The calibration weight arrangement of claim 1, wherein the drive source comprises a linear drive.

19. The calibration weight arrangement of claim 1, wherein the drive source comprises an actuator of a shape memory alloy working together with a heating device.

20. The calibration weight arrangement of claim 1, further comprising at least one roller or at least one lever, through which the drive source acts on the knee joint linkage to effect the vertical displacement.

* * * * *